United States Patent
Selvaganapathy et al.

(10) Patent No.: US 11,963,061 B2
(45) Date of Patent: Apr. 16, 2024

(54) METHOD AND APPARATUS FOR SIGNALLING RADIO LINK FAILURE

(71) Applicant: Nokia Solutions and Networks Oy, Espoo (FI)

(72) Inventors: Srinivasan Selvaganapathy, Bangalore (IN); Ahmad Awada, Munich (DE); Jedrzej Stanczak, Wroclaw (PL)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 185 days.

(21) Appl. No.: 17/173,765

(22) Filed: Feb. 11, 2021

(65) Prior Publication Data
US 2021/0258852 A1  Aug. 19, 2021

(30) Foreign Application Priority Data
Feb. 13, 2020  (IN) .............................. 202041006356

(51) Int. Cl.
*H04W 36/30* (2009.01)
*H04L 41/0668* (2022.01)
(Continued)

(52) U.S. Cl.
CPC ....... *H04W 36/305* (2018.08); *H04L 41/0668* (2013.01); *H04W 36/0069* (2018.08); *H04W 36/04* (2013.01); *H04W 88/06* (2013.01)

(58) Field of Classification Search
None
See application file for complete search history.

(56) References Cited

U.S. PATENT DOCUMENTS

2019/0223073 A1    7/2019  Chen et al.
2019/0356460 A1*  11/2019  Tsuboi .............. H04W 74/0833
(Continued)

FOREIGN PATENT DOCUMENTS

WO    2018175721 A1    9/2018
WO    2019240770 A1   12/2019
(Continued)

OTHER PUBLICATIONS

3GPP TSG-RAN WG2 Meeting #108 Source: CATT (Rapporteur) (Year: 2019).*
(Continued)

*Primary Examiner* — Alex Skripnikov
*Assistant Examiner* — Pamit Kaur
(74) *Attorney, Agent, or Firm* — Robert P. Michal, Esq.; Carter, DeLuca & Farrell LLP

(57) ABSTRACT

An apparatus comprising: at least one processor; and at least one memory including computer program code; the at least one memory and the computer program code configured to, with the at least one processor, cause the apparatus at least to: operate the apparatus in a dual connectivity mode, wherein the apparatus is in communication with a master cell group comprising a primary cell and at least one secondary cell and the apparatus is in communication with a secondary cell group comprising a primary cell and at least one secondary cell; detect a radio link failure between the apparatus and the primary cell of the secondary cell group; provide information based on the radio link failure to the primary cell of the master cell group, the information being that the radio link failure occurred on the secondary cell group while waiting for a prepared conditional cell change from the primary cell of the secondary cell group to be fulfilled.

20 Claims, 7 Drawing Sheets

(51) Int. Cl.
*H04W 36/00* (2009.01)
*H04W 36/04* (2009.01)
*H04W 88/06* (2009.01)

(56) References Cited

U.S. PATENT DOCUMENTS

| | | | | |
|---|---|---|---|---|
| 2022/0141735 A1* | 5/2022 | Liu | ................... | H04W 36/0079 370/331 |
| 2022/0338077 A1* | 10/2022 | Kim | ................... | H04W 76/27 |
| 2022/0338089 A1* | 10/2022 | Kim | ................... | H04W 36/0069 |
| 2023/0059975 A1* | 2/2023 | Wu | ................... | H04W 36/362 |

FOREIGN PATENT DOCUMENTS

| | | | |
|---|---|---|---|
| WO | 2021066722 | A1 | 4/2021 |
| WO | 2021067891 | A1 | 4/2021 |

OTHER PUBLICATIONS

"3rd Generation Partnership Project;Technical Specification Group Radio Access Network; NR;Radio Resource Control (RRC) protocol specification(Release 15)", 3GPP TS 38.331, V15.8.0, Dec. 2019, pp. 1-532.

"3rd Generation Partnership Project;Technical Specification Group Radio Access Network;NR; NR and NG-RAN Overall Description; Stage 2(Release 16)", 3GPP TS 38.300, V16.0.0, Dec. 2019, pp. 1-101.

"3rd Generation Partnership Project;Technical Specification Group Radio Access Network;Evolved Universal Terrestrial Radio Access (E-UTRA);Radio Resource Control (RRC);Protocol specification (Release 15)", 3GPP TS 36.331, V15.8.0, Dec. 2019, pp. 1-964.

International Search Report and Written Opinion for corresponding International application No. PCT/EP2021/052661; dated Jun. 10, 2021 (14 pages).

International Preliminary Report on Patentability for corresponding International application No. PCT/EP2021/052661; dated Aug. 11, 2022 (10 pages).

CATT, "Conditional PScell addition/change" 3GPP TSG-RAN WG2 Meeting #107bis, R2-1912133; Chongqing, China. Oct. 14-18, 2019 (2019): 1-4.

CATT (Rapporteur), "Report on Email Discussion [107b#52][NR MobE] Open Issues Conditional PSCell Addition/Change (CATT)." 3GPP TSG-RAN WG2 Meeting #108, R2-1915962; Reno, USA. Nov. 18-22, 2019 (2019): 1-46.

Ericsson, "Multiple inactive SCG configurations." 3GPP TSG-RAN WG2 #107, Tdoc R2-1910265; Prague, Czech Republic. Aug. 26-30, 2019 (2019): 1-3.

LG Electronics Inc., "SGC Failure Handling with Conditional PSCell Configuration." 3GPP TSG-RAN WG2 Meeting #108, R2-1916207; Reno, USA. Nov. 18-22, 2019 (2019): 1-3.

Nokia, et al. "On Rel-17 Conditional PSCell Addition and Change (CPAC)." 3GPP TSG-RAN WG2 Meeting #112 Electronic, R2-2009771; Elbonia. Nov. 2-13, 2020 (2020): 1-6.

Notice of Reasons for Refusal for corresponding Japanese application No. 2022-548399; dated Jun. 13, 2023 (8 pages) Machine Tranlsation.

* cited by examiner

METHOD AND APPARATUS FOR SIGNALLING RADIO LINK FAILURE

TECHNICAL FIELD

The present disclosure relates to an apparatus, a method, and a computer program and in particular but not exclusively for an apparatus, methods and computer programs for signalling radio link failure, in particular when master cell group fast recovery is configured.

BACKGROUND

A communication system can be seen as a facility that enables communication sessions between two or more entities such as communication devices, base stations/access points and/or other nodes by providing carriers between the various entities involved in the communications path. A communication system can be provided for example by means of a communication network and one or more compatible communications devices.

Access to the communication system may be via an appropriate communications device or terminal. A communications device is provided with an appropriate signal receiving and transmitting apparatus for enabling communications, for example enabling access to a communication network or communications directly with other communications device. The communications device may access a carrier provided by a station or access point, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known as the long-term evolution (LTE) or the Universal Mobile Telecommunications System (UMTS) radio-access technology. Another example communication system is so called 5G radio or new radio (NR) access technology.

STATEMENT OF INVENTION

According to an aspect, there is provided an apparatus comprising: at least one processor; and at least one memory including computer program code; the at least one memory and the computer program code configured to, with the at least one processor, cause the apparatus at least to: operate the apparatus in a dual connectivity mode, wherein the apparatus is in communication with a master cell group comprising a primary cell and at least one secondary cell and the apparatus is in communication with a secondary cell group comprising a primary cell and at least one secondary cell; detect a radio link failure between the apparatus and the primary cell of the secondary cell group; provide information based on the radio link failure to the primary cell of the master cell group, the information being that the radio link failure occurred on the secondary cell group while waiting for a prepared conditional cell change from the primary cell of the secondary cell group to be fulfilled.

The at least one memory and the computer program code may be configured to, with the at least one processor, cause the apparatus at least to send the information configured by the primary cell of the secondary cell group via its radio link or a radio link of the primary cell of the master cell group.

The information may be further configured to inform the primary cell of the master cell group an identity value associated with at least one candidate cell from the secondary cell group for which the apparatus has valid conditional change configuration.

The information configured to inform the primary cell of the master cell group an identity value associated with at least one candidate cell from the secondary cell group for which the apparatus has valid conditional change configuration may be a bitmap configured to indicate the at least one candidate cell within a measured cell list.

The information may be further configured to inform the primary cell of the master cell group of a conditional change execution condition associated with at least one candidate cell from the secondary cell group and a signal measurement of the primary cell of the secondary cell group and the at least one candidate cell from the secondary cell group.

The information may be further configured to inform the primary cell of the master cell group of the signal measurement of the primary cell of the secondary cell group and the at least one candidate cell from the secondary cell group may be a difference between the primary cell of the secondary cell group and the at least one candidate cell and respective conditional change execution condition for the conditional cell change associated with the cell.

The at least one memory and the computer program code may be configured to, with the at least one processor, cause the apparatus at least to: receive from the primary cell of the master cell group a radio resource control message comprising a cell identity of a prepared cell from the secondary cell group to change to; and perform a cell change from the primary cell of the secondary cell group to the prepared cell from the secondary cell group based on the cell identity.

The at least one memory and the computer program code may be configured to, with the at least one processor, cause the apparatus at least to: receive from the primary cell of the master group a radio resource control reconfiguration message comprising a cell identity of a cell other than a prepared cell from the secondary cell group to change to; and perform a cell change from the primary cell of the secondary cell group to an unprepared cell from the secondary cell group based on the cell identity.

The apparatus may be a user equipment.

According to a second aspect there is provided an apparatus comprising: at least one processor; and at least one memory including computer program code; the at least one memory and the computer program code configured to, with the at least one processor, cause the apparatus at least to: communicate with at least one further apparatus, wherein the further apparatus is configured to operate in a dual connectivity mode, in communication with a master cell group comprising the apparatus as a primary cell and at least one secondary cell and in communication with a secondary cell group comprising a primary cell and at least one secondary cell; receive information from the at least one further apparatus based on a radio link failure between the at least one further apparatus and the primary cell of the secondary cell group, the information being that the radio link failure occurred on the secondary cell group while waiting for a prepared conditional cell change from the primary cell of the secondary cell group to be fulfilled.

The information may be further configured to inform the apparatus an identity value associated with at least one candidate cell from the secondary cell group for which the at least one further apparatus has valid conditional change configuration.

The information configured to inform the apparatus the identity value associated with the at least one candidate cell from the secondary cell group for which the at least one further apparatus has valid conditional change configuration may be a bitmap configured to indicate the at least one candidate cell within a measured cell list.

The information may be further configured to inform the apparatus of a conditional change execution condition associated with at least one candidate cell from the secondary cell group and a signal measurement of the primary cell of the secondary cell group and the at least one candidate cell from the secondary cell group.

The information may be further configured to inform the apparatus of the signal measurement of the primary cell of the secondary cell group and the at least one candidate cell from the secondary cell group is a difference between the primary cell of the secondary cell group and the at least one candidate cell and respective conditional change execution condition for the conditional cell change associated with the cell.

The at least one memory and the computer program code may be configured to, with the at least one processor, cause the apparatus at least to: generate a radio resource control message comprising a cell identity of a prepared cell from the secondary cell group to change to based on the information; and provide the radio resource control message to the at least one further apparatus such that the at least one further apparatus is configured to perform a cell change from the primary cell of the secondary cell group to the prepared cell from the secondary cell group based on the cell identity.

The at least one memory and the computer program code may be configured to, with the at least one processor, cause the apparatus at least to: generate a radio resource control reconfiguration message comprising a cell identity of a cell other than a prepared cell from the secondary cell group to change to based on the information; and provide the radio resource control message to the at least one further apparatus such that the at least one further apparatus is configured to perform a cell change from the primary cell of the secondary cell group to an unprepared cell from the secondary cell group based on the cell identity.

The apparatus may be a master node.

According to a third aspect there is provided an apparatus comprising: at least one processor; and at least one memory including computer program code; the at least one memory and the computer program code configured to, with the at least one processor, cause the apparatus at least to: communicate with at least one further apparatus, wherein the further apparatus is configured to operate in a dual connectivity mode, in communication with a master cell group comprising a primary cell and at least one secondary cell and in communication with a secondary cell group comprising a primary cell and the apparatus as a secondary cell; and receive information from the at least one further apparatus for a cell change from the primary cell of the secondary cell group.

The at least one memory and the computer program code may be configured to, with the at least one processor, cause the apparatus at least to: receive a message from the primary cell of the master cell group, the message comprising information based on a radio link failure between the primary cell of the secondary cell group and the at least one further apparatus while waiting for a prepared conditional cell change from the primary cell of the secondary cell group to be fulfilled.

According to a fourth aspect, there is provided a method for an apparatus comprising: operating the apparatus in a dual connectivity mode, wherein the apparatus is in communication with a master cell group comprising a primary cell and at least one secondary cell and the apparatus is in communication with a secondary cell group comprising a primary cell and at least one secondary cell; detecting a radio link failure between the apparatus and the primary cell of the secondary cell group; providing information based on the radio link failure to the primary cell of the master cell group, the information being that the radio link failure occurred on the secondary cell group while waiting for a prepared conditional cell change from the primary cell of the secondary cell group to be fulfilled.

The method may further comprise sending the information configured by the primary cell of the secondary cell group via its radio link or a radio link of the primary cell of the master cell group.

The information may be further configured to inform the primary cell of the master cell group an identity value associated with at least one candidate cell from the secondary cell group for which the apparatus has valid conditional change configuration.

The information configured to inform the primary cell of the master cell group an identity value associated with at least one candidate cell from the secondary cell group for which the apparatus has valid conditional change configuration may be a bitmap configured to indicate the at least one candidate cell within a measured cell list.

The information may be further configured to inform the primary cell of the master cell group of a conditional change execution condition associated with at least one candidate cell from the secondary cell group and a signal measurement of the primary cell of the secondary cell group and the at least one candidate cell from the secondary cell group.

The information may be further configured to inform the primary cell of the master cell group of the signal measurement of the primary cell of the secondary cell group and the at least one candidate cell from the secondary cell group may be a difference between the primary cell of the secondary cell group and the at least one candidate cell and respective conditional change execution condition for the conditional cell change associated with the cell.

The method may comprise: receiving from the primary cell of the master cell group a radio resource control message comprising a cell identity of a prepared cell from the secondary cell group to change to; and performing a cell change from the primary cell of the secondary cell group to the prepared cell from the secondary cell group based on the cell identity.

The method may comprise: receiving from the primary cell of the master group a radio resource control reconfiguration message comprising a cell identity of a cell other than a prepared cell from the secondary cell group to change to; and performing a cell change from the primary cell of the secondary cell group to an unprepared cell from the secondary cell group based on the cell identity.

The apparatus may be a user equipment.

According to a fifth aspect there is provided a method for an apparatus comprising: communicating with at least one further apparatus, wherein the further apparatus is configured to operate in a dual connectivity mode, in communication with a master cell group comprising the apparatus as a primary cell and at least one secondary cell and in communication with a secondary cell group comprising a primary cell and at least one secondary cell; receiving information from the at least one further apparatus based on a radio link failure between the at least one further apparatus and the primary cell of the secondary cell group, the information being that the radio link failure occurred on the secondary cell group while waiting for a prepared conditional cell change from the primary cell of the secondary cell group to be fulfilled.

The information may be further configured to inform the apparatus an identity value associated with at least one candidate cell from the secondary cell group for which the at least one further apparatus has valid conditional change configuration.

The information configured to inform the apparatus the identity value associated with the at least one candidate cell from the secondary cell group for which the at least one further apparatus has valid conditional change configuration may be a bitmap configured to indicate the at least one candidate cell within a measured cell list.

The information may be further configured to inform the apparatus of a conditional change execution condition associated with at least one candidate cell from the secondary cell group and a signal measurement of the primary cell of the secondary cell group and the at least one candidate cell from the secondary cell group.

The information may be further configured to inform the apparatus of the signal measurement of the primary cell of the secondary cell group and the at least one candidate cell from the secondary cell group is a difference between the primary cell of the secondary cell group and the at least one candidate cell and respective conditional change execution condition for the conditional cell change associated with the cell.

The method may comprise: generating a radio resource control message comprising a cell identity of a prepared cell from the secondary cell group to change to based on the information; and providing the radio resource control message to the at least one further apparatus such that the at least one further apparatus is configured to perform a cell change from the primary cell of the secondary cell group to the prepared cell from the secondary cell group based on the cell identity.

The method may comprise: generating a radio resource control reconfiguration message comprising a cell identity of a cell other than a prepared cell from the secondary cell group to change to based on the information; and providing the radio resource control message to the at least one further apparatus such that the at least one further apparatus is configured to perform a cell change from the primary cell of the secondary cell group to an unprepared cell from the secondary cell group based on the cell identity.

The apparatus may be a master node.

According to a sixth aspect there is provided a method for an apparatus comprising: communicating with at least one further apparatus, wherein the further apparatus is configured to operate in a dual connectivity mode, in communication with a master cell group comprising a primary cell and at least one secondary cell and in communication with a secondary cell group comprising a primary cell and the apparatus as a secondary cell; and receiving information from the at least one further apparatus for a cell change from the primary cell of the secondary cell group.

The method may comprise receiving a message from the primary cell of the master cell group, the message comprising information based on a radio link failure between the primary cell of the secondary cell group and the at least one further apparatus while waiting for a prepared conditional cell change from the primary cell of the secondary cell group to be fulfilled.

According to a seventh aspect, there is provided an apparatus comprising means configured to: operate the apparatus in a dual connectivity mode, wherein the apparatus is in communication with a master cell group comprising a primary cell and at least one secondary cell and the apparatus is in communication with a secondary cell group comprising a primary cell and at least one secondary cell; detect a radio link failure between the apparatus and the primary cell of the secondary cell group; provide information based on the radio link failure to the primary cell of the master cell group, the information being that the radio link failure occurred on the secondary cell group while waiting for a prepared conditional cell change from the primary cell of the secondary cell group to be fulfilled.

The means may be configured to send the information configured by the primary cell of the secondary cell group via its radio link or a radio link of the primary cell of the master cell group.

The information may be further configured to inform the primary cell of the master cell group an identity value associated with at least one candidate cell from the secondary cell group for which the apparatus has valid conditional change configuration.

The information configured to inform the primary cell of the master cell group an identity value associated with at least one candidate cell from the secondary cell group for which the apparatus has valid conditional change configuration may be a bitmap configured to indicate the at least one candidate cell within a measured cell list.

The information may be further configured to inform the primary cell of the master cell group of a conditional change execution condition associated with at least one candidate cell from the secondary cell group and a signal measurement of the primary cell of the secondary cell group and the at least one candidate cell from the secondary cell group.

The information may be further configured to inform the primary cell of the master cell group of the signal measurement of the primary cell of the secondary cell group and the at least one candidate cell from the secondary cell group may be a difference between the primary cell of the secondary cell group and the at least one candidate cell and respective conditional change execution condition for the conditional cell change associated with the cell.

The means may be configured to: receive from the primary cell of the master cell group a radio resource control message comprising a cell identity of a prepared cell from the secondary cell group to change to; and perform a cell change from the primary cell of the secondary cell group to the prepared cell from the secondary cell group based on the cell identity.

The means may be configured to: receive from the primary cell of the master group a radio resource control reconfiguration message comprising a cell identity of a cell other than a prepared cell from the secondary cell group to change to; and perform a cell change from the primary cell of the secondary cell group to an unprepared cell from the secondary cell group based on the cell identity.

The apparatus may be a user equipment.

According to an eighth aspect there is provided an apparatus comprising means configured to: communicate with at least one further apparatus, wherein the further apparatus is configured to operate in a dual connectivity mode, in communication with a master cell group comprising the apparatus as a primary cell and at least one secondary cell and in communication with a secondary cell group comprising a primary cell and at least one secondary cell; receive information from the at least one further apparatus based on a radio link failure between the at least one further apparatus and the primary cell of the secondary cell group, the information being that the radio link failure occurred on the secondary cell group while waiting for a prepared conditional cell change from the primary cell of the secondary cell group to be fulfilled.

The information may be further configured to inform the apparatus an identity value associated with at least one candidate cell from the secondary cell group for which the at least one further apparatus has valid conditional change configuration.

The information configured to inform the apparatus the identity value associated with the at least one candidate cell from the secondary cell group for which the at least one further apparatus has valid conditional change configuration may be a bitmap configured to indicate the at least one candidate cell within a measured cell list.

The information may be further configured to inform the apparatus of a conditional change execution condition associated with at least one candidate cell from the secondary cell group and a signal measurement of the primary cell of the secondary cell group and the at least one candidate cell from the secondary cell group.

The information may be further configured to inform the apparatus of the signal measurement of the primary cell of the secondary cell group and the at least one candidate cell from the secondary cell group is a difference between the primary cell of the secondary cell group and the at least one candidate cell and respective conditional change execution condition for the conditional cell change associated with the cell.

The means may be configured to: generate a radio resource control message comprising a cell identity of a prepared cell from the secondary cell group to change to based on the information; and provide the radio resource control message to the at least one further apparatus such that the at least one further apparatus is configured to perform a cell change from the primary cell of the secondary cell group to the prepared cell from the secondary cell group based on the cell identity.

The means may be configured to: generate a radio resource control reconfiguration message comprising a cell identity of a cell other than a prepared cell from the secondary cell group to change to based on the information; and provide the radio resource control message to the at least one further apparatus such that the at least one further apparatus is configured to perform a cell change from the primary cell of the secondary cell group to an unprepared cell from the secondary cell group based on the cell identity.

The apparatus may be a master node.

According to a ninth aspect there is provided an apparatus comprising means configured to: communicate with at least one further apparatus, wherein the further apparatus is configured to operate in a dual connectivity mode, in communication with a master cell group comprising a primary cell and at least one secondary cell and in communication with a secondary cell group comprising a primary cell and the apparatus as a secondary cell; and receive information from the at least one further apparatus for a cell change from the primary cell of the secondary cell group.

The means may be configured to: receive a message from the primary cell of the master cell group, the message comprising information based on a radio link failure between the primary cell of the secondary cell group and the at least one further apparatus while waiting for a prepared conditional cell change from the primary cell of the secondary cell group to be fulfilled.

According to a tenth aspect, there is provided a non-transitory computer readable storage medium comprising computer readable instructions, which when run by at least one processor, cause an apparatus to: operate the apparatus in a dual connectivity mode, wherein the apparatus is in communication with a master cell group comprising a primary cell and at least one secondary cell and the apparatus is in communication with a secondary cell group comprising a primary cell and at least one secondary cell; detect a radio link failure between the apparatus and the primary cell of the secondary cell group; provide information based on the radio link failure to the primary cell of the master cell group, the information being that the radio link failure occurred on the secondary cell group while waiting for a prepared conditional cell change from the primary cell of the secondary cell group to be fulfilled.

According to an eleventh aspect, there is provided a non-transitory computer readable storage medium comprising computer readable instructions, which when run by at least one processor, cause an apparatus to: communicate with at least one further apparatus, wherein the further apparatus is configured to operate in a dual connectivity mode, in communication with a master cell group comprising the apparatus as a primary cell and at least one secondary cell and in communication with a secondary cell group comprising a primary cell and at least one secondary cell; receive information from the at least one further apparatus based on a radio link failure between the at least one further apparatus and the primary cell of the secondary cell group, the information being that the radio link failure occurred on the secondary cell group while waiting for a prepared conditional cell change from the primary cell of the secondary cell group to be fulfilled.

According to a twelfth aspect, there is provided a non-transitory computer readable storage medium comprising computer readable instructions, which when run by at least one processor, cause an apparatus to: communicate with at least one further apparatus, wherein the further apparatus is configured to operate in a dual connectivity mode, in communication with a master cell group comprising a primary cell and at least one secondary cell and in communication with a secondary cell group comprising a primary cell and the apparatus as a secondary cell; and receive information from the at least one further apparatus for a cell change from the primary cell of the secondary cell group.

According to a thirteenth aspect, there is provided a computer program comprising instructions for causing an apparatus to perform at least: operate the apparatus in a dual connectivity mode, wherein the apparatus is in communication with a master cell group comprising a primary cell and at least one secondary cell and the apparatus is in communication with a secondary cell group comprising a primary cell and at least one secondary cell; detect a radio link failure between the apparatus and the primary cell of the secondary cell group; provide information based on the radio link failure to the primary cell of the master cell group, the information being that the radio link failure occurred on the secondary cell group while waiting for a prepared conditional cell change from the primary cell of the secondary cell group to be fulfilled.

According to a fourteenth aspect, there is provided a computer program comprising instructions for causing an apparatus to perform at least: communicate with at least one further apparatus, wherein the further apparatus is configured to operate in a dual connectivity mode, in communication with a master cell group comprising the apparatus as a primary cell and at least one secondary cell and in communication with a secondary cell group comprising a primary cell and at least one secondary cell; receive information from the at least one further apparatus based on a radio link failure between the at least one further apparatus and the primary cell of the secondary cell group, the information being that the radio link failure occurred on the secondary cell group while waiting for a prepared conditional cell change from the primary cell of the secondary cell group to be fulfilled.

According to a fifteenth aspect, there is provided a computer program comprising instructions for causing an apparatus to perform at least: communicate with at least one further apparatus, wherein the further apparatus is configured to operate in a dual connectivity mode, in communication with a master cell group comprising a primary cell and at least one secondary cell and in communication with a secondary cell group comprising a primary cell and the apparatus as a secondary cell; and receive information from the at least one further apparatus for a cell change from the primary cell of the secondary cell group. In the above, many different aspects have been described. It should be appreciated that further aspects may be provided by the combination of any two or more of the aspects described above.

Various other aspects are also described in the following detailed description and in the attached claims.

BRIEF DESCRIPTION OF THE FIGURES

Some example embodiments will now be described in further detail, by way of example only, with reference to the following examples and accompanying drawings, in which.

DETAILED DESCRIPTION

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
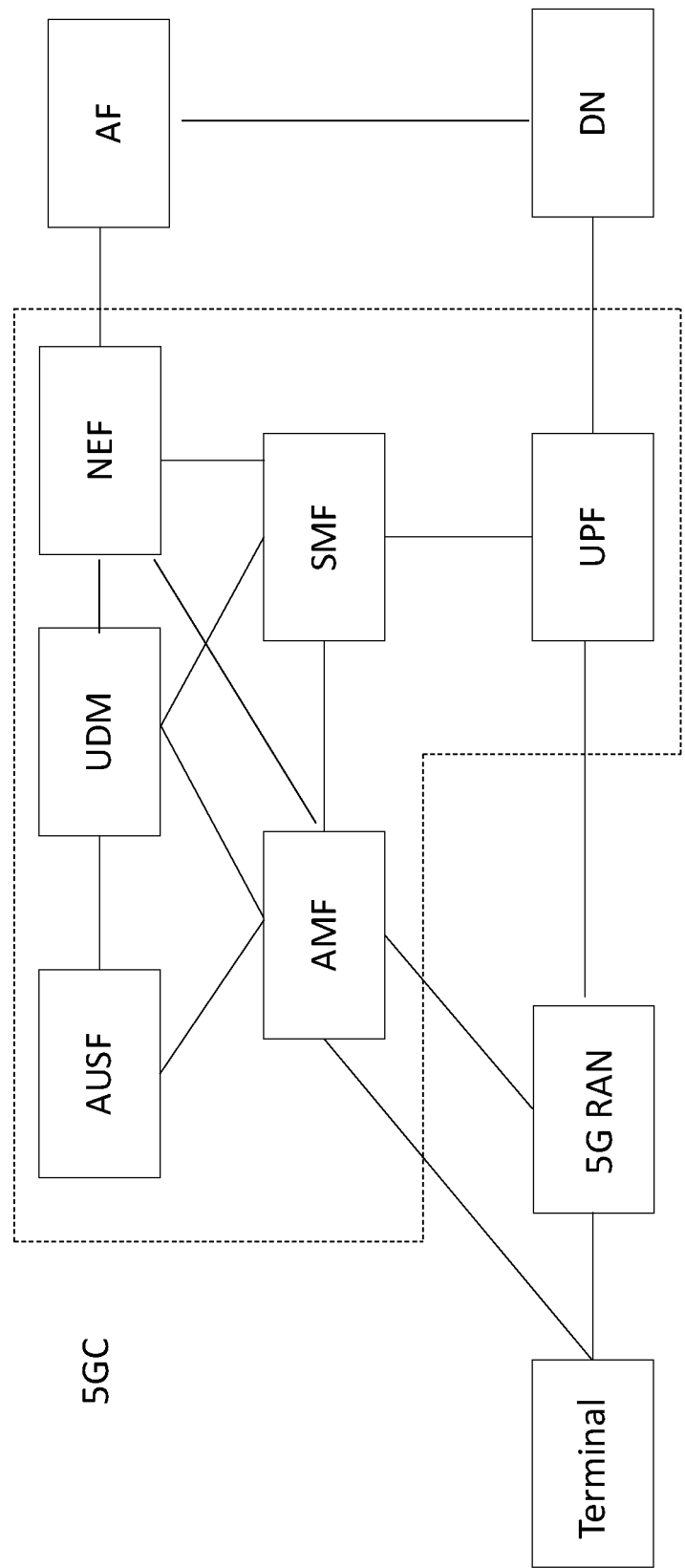
FIG. 1 shows a schematic representation of a 5G system (5GS)

FIG. 1 shows a schematic representation of a 5G system (5GS). The 5GS may be comprised by a terminal or user equipment (UE), a 5G radio access network (5GRAN) or next generation radio access network (NG-RAN), a 5G core network (5GC), one or more application function (AF) and one or more data networks (DN).

The 5G-RAN may comprise one or more gNodeB (GNB) or one or more gNodeB (GNB) distributed unit functions connected to one or more gNodeB (GNB) centralized unit functions.

The 5GC may comprise the following entities: Network Slice Selection Function (NSSF); Network Exposure Function; Network Repository Function (NRF); Policy Control Function (PCF); Unified Data Management (UDM); Application Function (AF); Authentication Server Function (AUSF); an Access and Mobility Management Function (AMF); and Session Management Function (SMF).

Figure 2:
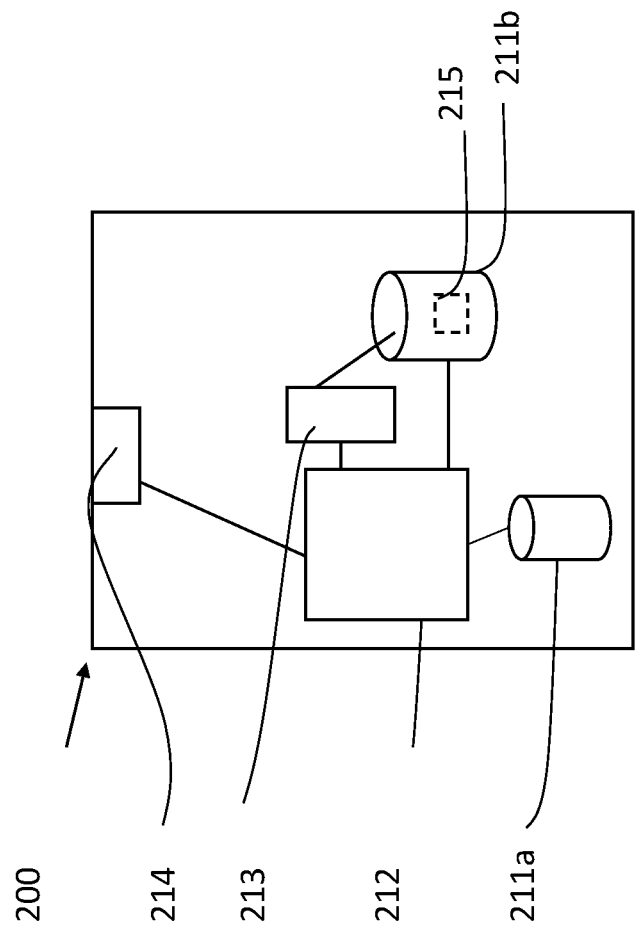
FIG. 2 shows a schematic representation of a control apparatus.

FIG. 2 illustrates an example of a control apparatus 200 for controlling a function of the 5GRAN or the 5GC as illustrated on FIG. 1. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b. The control apparatus 200 may be interconnected with another control apparatus 200 controlling another function of the 5GRAN or the 5GC. In some embodiments, each function of the 5GRAN or the 5GC comprises a control apparatus 200. In alternative embodiments, two or more functions of the 5GRAN or the 5GC may share a control apparatus.

Figure 3:
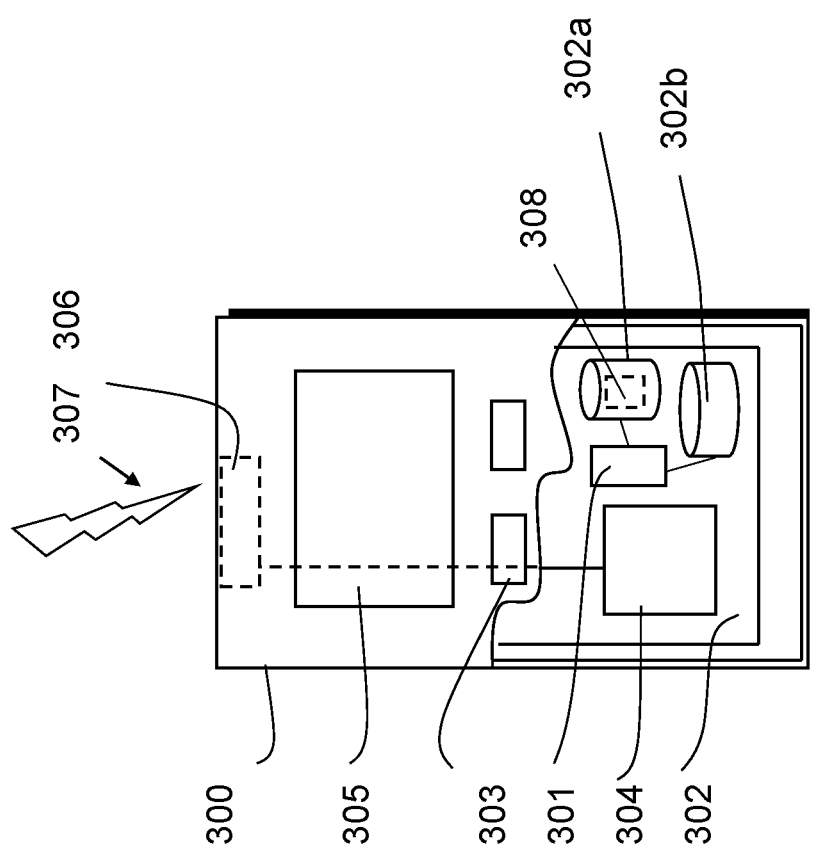
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, an Internet of things (IoT) type communication device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 302b and the ROM 302a. The at least one processor 301 may be configured to execute an appropriate software code 308. The software code 308 may for example allow to perform one or more of the present aspects. The software code 308 may be stored in the ROM 302a.

The processor, storage and other relevant control apparatus can be provided on an appropriate circuit board and/or in chipsets. This feature is denoted by reference 304. The device may optionally have a user interface such as key pad 305, touch sensitive screen or pad, combinations thereof or the like. Optionally one or more of a display, a speaker and a microphone may be provided depending on the type of the device.

One or more of the following aspects relate to mobility in a cellular/mobile communication network such as a LTE network or NR network Conditional handover (CHO) is a feature that is specified in Release 16 in two separate work items (WI) on mobility enhancement for both LTE and NR. Conditional handover is similar to baseline handover (BHO) and an example of which is shown in FIG. 4.

In this example there is shown a system comprising a UE 401, source node (SN) 403, target node (TN) 405, other potential target nodes 407, a serving gateway/user plane function (S-GW/UPF) 409 and mobile management entity/Access and Mobility Management Function (MME/AMF) 411. In this example the user equipment 401 is configured to be handed over by the source node 403 to the target node 405 as part of a conditional handover.

Figure 4:
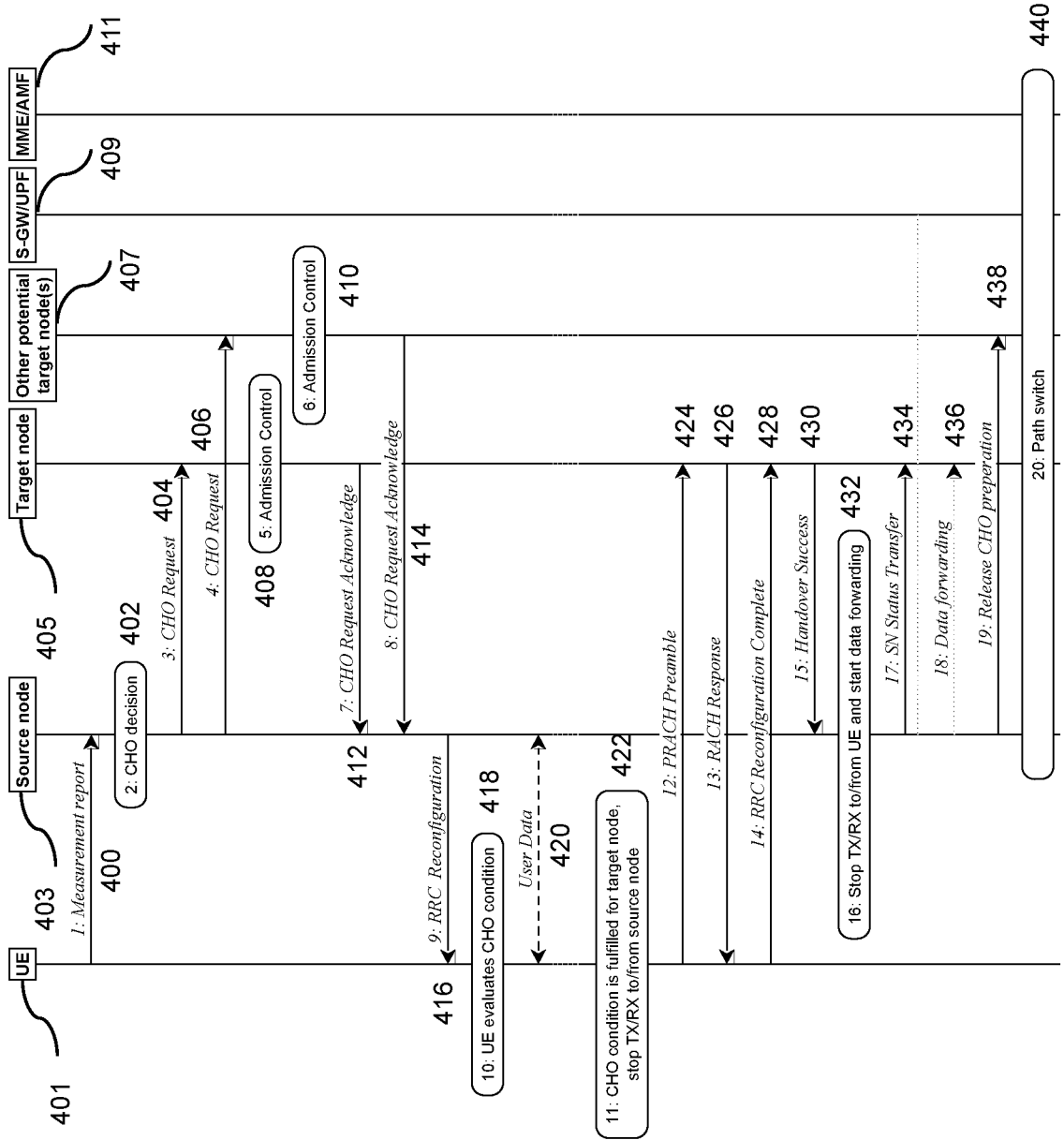
FIG. 4 shows a signalling diagram of a process for performing a conditional handover.

The first operation is one of triggering the UE 401 (based on some event) to send a measurement report from the UE 401 to the source node 403 as shown in FIG. 4 by step 400.

The source node having received the measurement report can then be configured to perform a conditional handover decision where the source node hands over to another node (either the target node 405 or other potential target node(s) 407) based on the measurement report as shown in FIG. 4 by step 402.

The source node is then configured to prepare one or more potential target nodes. This preparation may be implemented by transmitting a CHO request to the potential target nodes as shown in FIG. 4 by the steps 404 (CHO request to the target node) and 406 (CHO request to the other potential target node(s)).

The messages are received and admission control performed as shown in FIG. 4 by the steps 408 (admission control within the target node) and 410 (admission control within the other potential target node(s)).

Furthermore the potential target nodes can be configured to transmit an acknowledge message back to the source node 403 as shown in FIG. 4 by the steps 412 (CHO request acknowledge from the target node) and 414 (CHO request acknowledgement from the other potential target node(s)).

Having received the acknowledgement messages the source node 403 is then configured to generate and transmit a radio resource control (RRC) reconfiguration message, or handover command to the UE 401 as shown in FIG. 4 by step 416.

In contrast to a baseline handover (BHO) where the UE will immediately access the target cell to complete the handover, for a conditional handover (CHO) the UE 401 is configured to only access the target cell once an additional CHO execution condition expires. In other words the HO preparation and execution phases are decoupled. The condition is configured, for example by the source node, in the HO Command Thus for example the UE is configured to evaluate the CHO condition as shown in FIG. 4 by step 418.

While the CHO condition is being evaluated by the UE data may still be exchanged between the UE 401 and the source node 403 as shown in FIG. 4 by step 420.

When the CHO condition is fulfilled for the target node then the transmitting/receiving of user data is stopped between the UE 401 and the source node 403 as shown in FIG. 4 by step 422.

Furthermore the UE 401 is configured to transmit a physical random access channel (PRACH) preamble to the target node 405 as shown in FIG. 4 by step 424.

A random access channel (RACH) response from the target node 405 is then transmitted back to the UE 401 as shown in FIG. 4 by step 426.

A radio resource control (RRC) reconfiguration complete message is then transmitted from the UE 401 to the target node 405 as shown in FIG. 4 by step 428.

A handover success message is transmitted from the target node 405 to the source node 403 as shown in FIG. 4 by step 430.

The source node 403 is then configured to stop transmitting/receiving data to/from the UE 401 and start a data forwarding operation for any received data as shown in FIG. 4 by step 432.

A sequence number (SN) status transfer message is then forwarded from the source node 403 to the target node 405 as shown in FIG. 4 by step 434.

Additionally data forwarding between the source node 403 to the target node 405 is performed as shown in FIG. 4 by step 436.

The source node 403 furthermore releases the other potential target node(s) 407 CHO preparations as shown in FIG. 4 by step 438.

Then the path switch information is passed to the core network as shown in FIG. 4 by step 440.

In such a manner the CHO enables the HO command to be sent very early, when the UE is still safe in the source cell, without risking the access in the target cell and the stability of its radio link. That is conditional handover provides mobility robustness.

CHO can also be extended for dual connectivity situations. In such situations there is a master cell group (MCG) comprising a primary cell (PCell) and one or more secondary cell (SCell) and a secondary cell group (SCG) comprising a primary cell (PSCell) and one or more secondary cells (PSCell).

In these situations conditional handover functionality can be extended for primary cell within the secondary group (PSCell) addition/change procedures associated with Multi-RAT Dual Connectivity (MR-DC) (non-standalone) scenarios. This may be defined as Conditional PSCell Change (CPC).

The functionality of CPC is similar to CHO in standalone architecture as shown in FIG. 4 with the difference that the conditional execution is applied for changes of PSCell based on measurements on the secondary cell group (SCG). The radio link between the UE and master node (MN) will be available during the execution of conditional PSCell change which can be used by the UE for radio resource control (RRC) signalling in this case, whereas in case of CHO in standalone architecture, the radio link between UE and network is completely interrupted from the start of CHO execution to its completion. Moreover, in case of failure scenarios during conditional PSCell change, the failure can be communicated to the master node in this case.

Figure 5:
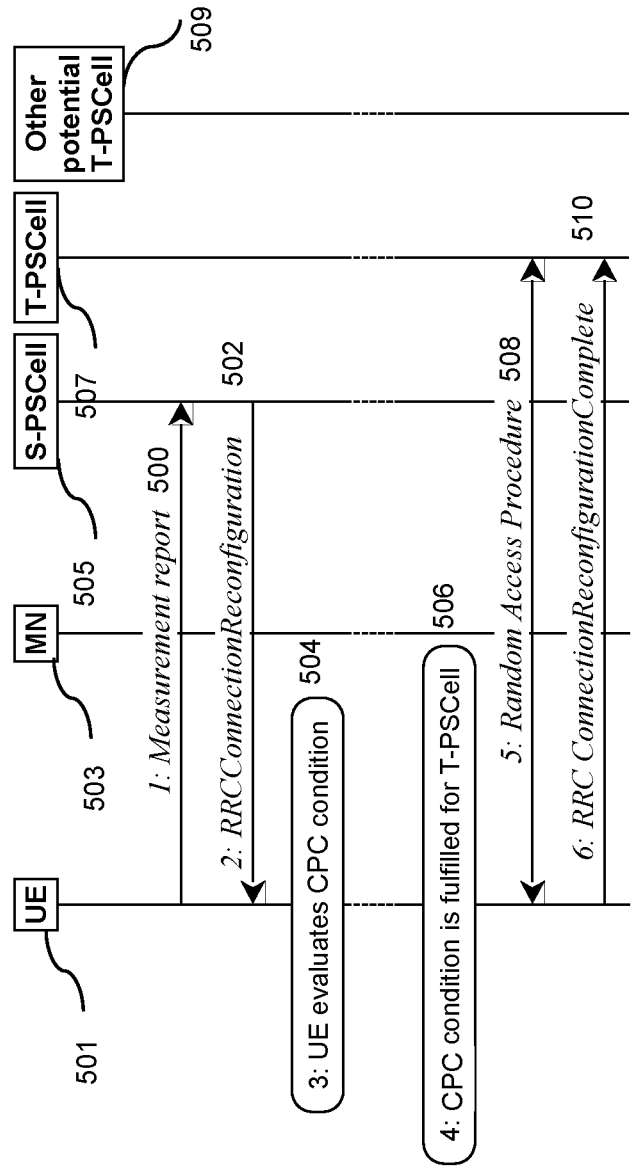
FIG. 5 shows a signalling diagram of a process for performing a conditional PS cell change triggered by SN.

For example with respect to FIG. 5 an example conditional PSCell change (CPC) triggered by the secondary node using signalling radio bearer 3 (SRB3).

Thus for example the UE 501 is configured to send the measurement report to the source primary cell in the secondary group (S-PSCell) 505 as shown in FIG. 5 by step 500.

The RRCConnection reconfiguration message is then sent back from the S-PSCell 505 to the UE 501 as shown in FIG. 5 by step 502.

The UE is then configured to evaluate the CPC condition as shown in FIG. 5 by step 504. While the evaluation is performed data may be transferred between the UE 501 and the master node 503. Data transmission via the source secondary node is also possible in this case.

The CPC condition is fulfilled for the T-PSCell 507 as shown in FIG. 5 by step 506.

When the CPC condition is fulfilled then the random access procedure (similar to the CHO condition fulfilment shown in FIG. 4) is performed between the UE 501 and the target primary cell in the secondary group (T-PSCell) 507 as shown in FIG. 5 by step 508. During this procedure the data transfer between UE and master node still possible.

Then when completed the UE 501 is configured to send the RRC Connection reconfiguration complete message to the T-PSCell 507 as shown in FIG. 5 by step 510.

In a basic PSCell change scenario initiated by a secondary node (SN) without master node (MN) involvement, the steps for the signalling procedure when the UE experiences secondary group-radio link failure (S-RLF) due to various reasons including timer failure (T310 expiry) are as follows:

The UE suspends secondary cell group (SCG) Radio bearers and resets the secondary cell group-medium access control (SCG-MAC);

The UE sends SCG-Failure-Information in a radio resource control (RRC) message to the master node (MN) via a MN radio link. This message includes the failure cause and also the latest measurement reports as per source node (SN) measurement configuration; and The MN may forward the SCG-Failure information to the SN via a SN-Modification-Request message to inform the failure scenario so that the SN can stop scheduling towards UE.

When the master node (MN) receives the SCG-Failure indication message from the UE two actions are possible at MN:

If the measurement results contain the cells served by the same secondary node (SN), the master node (MN) may be configured to send a SN-Modification-Request to inform the SCG-Failure to the SN and allow the SN to take further actions that would be signalled via MN; and If the measurement results contain cells served by other secondary node (SN), the master node (MN) may initiate a SN cell change procedure by triggering a SN Addition procedure without forwarding the SCG-Failure information to a source SN. Herein, the MN has already decided to take the action for handling the failure.

In case the SCG Failure happens after the UE receives a conditional PSCell change (CPC) command from the SN, the SCG Failure information indication needs to be improved to enable the MN to take the appropriate action for the failure considering the status of conditional PSCell change and also the prepared cell information. Even in case the MN decides to trigger immediate PSCell change to prepared cell, it needs to know this additional information.

As described above, the SCG-Failure-Information that is used to provide information about the failure of SCG does not contain any indication about the prepared PSCells. In other words there is no information about PSCells that have been prepared by the SN without MN involvement and for which the UE has received its conditional PSCell change configurations.

For example a SCG-Failure-Information message is shown below for NR SCG failure, and a similar message exists for LTE SCG failures
SCGFailureInformation message
  ASN1START
  TAG-SCGFAILUREINFORMATION-START
SCGFailureInformation:: =SEQUENCE {
  criticalExtensions CHOICE {
    scgFailureInformation SCGFailureInformation-IEs,
    criticalExtensionsFuture SEQUENCE { }
  }
}
SCGFailureInformation-IEs:: =SEQUENCE {
  failureReportSCG FailureReportSCG OPTIONAL,
  nonCriticalExtension SEQUENCE { } OPTIONAL
}
FailureReportSCG:: =SEQUENCE {
  failureType ENUMERATED {
    t310-Expiry, randomAccessProblem,
    rlc-MaxNumRetx,
    synchReconfigFailureSCG, scg-ReconfigFailure,
    srb3-IntegrityFailure, spare2, spare1},
  measResultFreqList MeasResultFreqList OPTIONAL,
  measResultSCG-Failure OCTET STRING (CONTAINING MeasResultSCG-Failure)
OPTIONAL,
  . . .
}
MeasResultFreqList:: =SEQUENCE (SIZE (1 . . . maxFreq)) OF MeasResult2NR
  TAG-SCGFAILUREINFORMATION-STOP
  ASN1STOP

| SCGFailureInformation field descriptions |
|---|
| measResultFreqList<br>The field contains available results of measurements on NR frequencies the UE is configured to measure by measConfig.<br>measResultSCG-Failure<br>The field contains the MeasResultSCG-Failure IE which includes available results of measurements on NR frequencies the UE is configured to measure by the NR SCG RRCReconfiguration message. |

The concept as discussed in some embodiments is a signalling procedure for secondary cell-radio link failure (S-RLF) reporting when the UE is having conditional primary cell in secondary group (PSCell) change configured already by the secondary node (SN) without master node (MN) involvement.

Thus in some embodiments on detection of a S-RLF when there is valid conditional PSCell change execution command pending, the UE sends a SCG-Failure-indication message to the MN with the following changes:

The SCG-Failure-Indication message includes additional information to inform the MN that the conditional change of the PSCell has been already prepared. This information can in some embodiments be represented by a parameter/flag designated a Conditional-PSCell-Change-pending parameter/flag. In other words the UE has received a conditional PSCell change configuration but has not executed the change (for example the S-RLF has occurred while waiting for the PSCell change execution condition to be fulfilled).

The SCG-Failure-Indication message may also be configured to indicate the cell identities of the prepared candidate PSCells for which the UE has valid conditional change configurations. In some embodiments this can be provided as a bitmap to indicate the prepared cells within measured cell list. In some embodiments the MN uses this information to decide on whether to trigger the SN change to an unprepared cell or execute a PSCell change to a prepared cell. Herein, the MN may also use the signal strength difference between the prepared and unprepared cells.

The UE may also be configured to include additional information about the conditional PSCell change execution condition with respect to each prepared PSCell along with the measurement of source PSCell and prepared PSCells. Alternatively in some embodiments, and to simplify the signaling, the SCG failure information may include the delta between the measured results and the execution condition for each of the measured cells. This information can be used by the MN to select a new PSCell within prepared cells.

In some embodiments on reception of this information, the MN may be configured to decide to send a RRC message containing the cell identity of the prepared cell to which immediate PSCell change shall be triggered and also inform the SN that the conditional cell change execution was triggered.

Furthermore in some embodiments the MN may initiate PSCell change towards an unprepared target cell and send new a RRC-Reconfiguration message. In this case the MN informs the SN to cancel the conditional PSCell preparation as part of inter-node message carrying the SCG-Failure information.

In some embodiments the Modified SCG-Failure-Indication reporting can be controlled by the SN via RRC signaling which is applicable only in case if the conditional cell change was not known to the MN. Otherwise the legacy SCG-Failure-Indication can continue.

Figure 6:
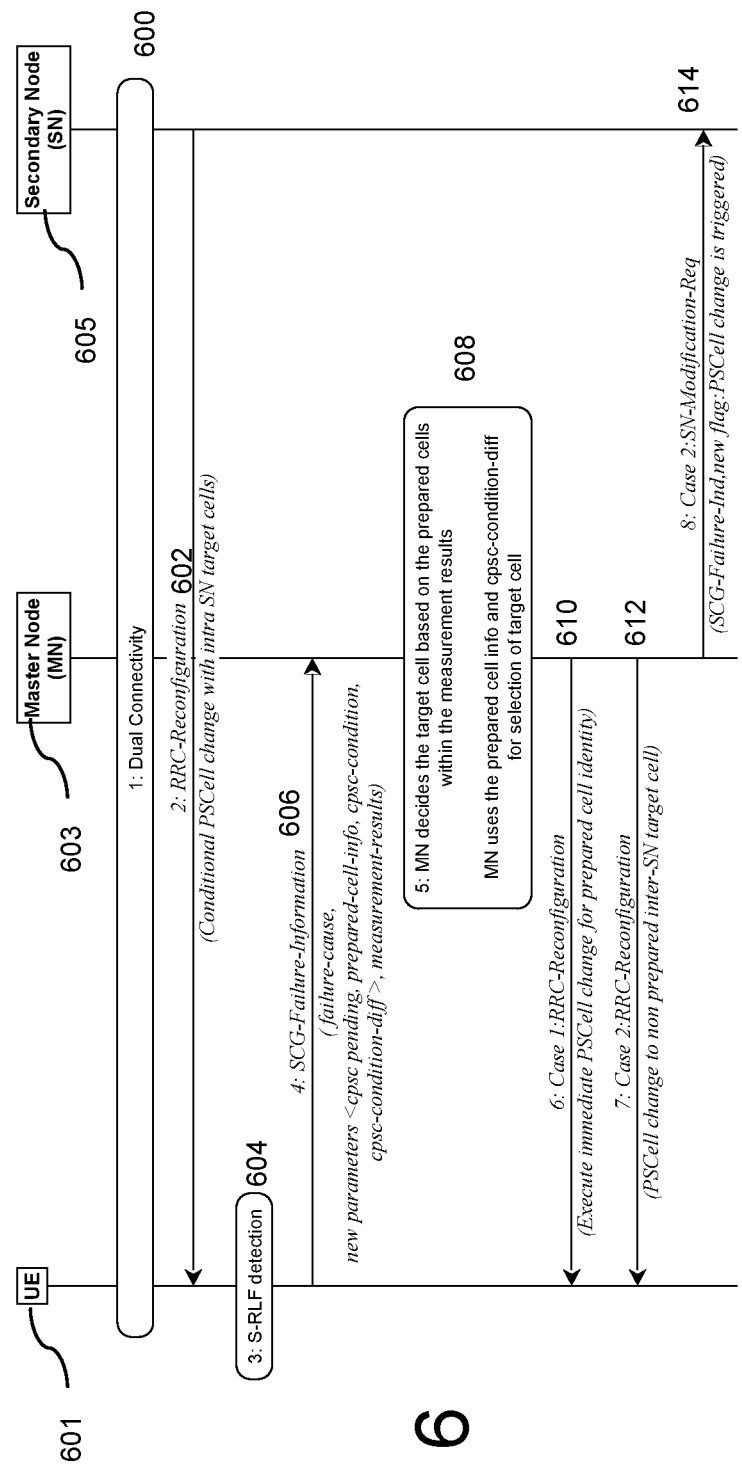
FIG. 6 shows a signalling diagram of a process for secondary cell group failure messaging according to some embodiments.

The message sequence illustrating the modified SCG-Failure-Indication procedure triggered on S-RLF when conditional PSCell change is pending is shown with respect to FIG. 6.

Thus for example the UE 601, master node (MN) 603 and secondary node (SN) 605 are configured to be operating in a dual connectivity mode as shown in FIG. 6 by step 600.

Then as part of a conditional PSCell change with intra SN target cells the secondary node 605 is configured to transmit to the UE a RRC reconfiguration message as shown in FIG. 6 by step 602.

At some point the UE is configured to detect a secondary cell radio link failure (S-RLF) as shown in FIG. 6 by step 604.

This causes the UE 601 to generate and transmit to the master node 603 a secondary cell group-failure-message (SCG-failure-message) as shown in FIG. 6 by step 608. The SCG-failure-mess age comprises the information (and implemented as the following parameters):

Information (CPC pending) indicating whether the conditional PSCell change is pending. In other words information indicating whether the UE has a valid conditional PSCell change configuration (or the execution condition was not yet met) while S-RLF has been detected;

Information (Prepared-cell-info) indicating the cell identities (Physical or global cell identity, PCIs) of the PSCells that have been prepared for conditional PSCell change execution;

Information (Cpsc-condition) indicating the conditional PSCell execution condition of each prepared target cell at the UE; and Information (measurement-results) which may include measurements for source PSCell and prepared target PS Cells.

In some embodiments (and may be implemented as an alternative to the parameter Cpsc-condition) the message may further comprise information (Cpsc-condition-diff) which includes the delta between the measured results and the execution condition for each of the measured cells. For example the UE may be configured to indicate if the condition has been fulfilled at all (at least temporarily, not necessarily for duration of Time-to-trigger) or not. In some embodiments if an A3 event is configured (the A3 event being where a target PSCell becomes offset better than source PSCell) for conditional PSCell change the UE may include within the message information indicating the difference between the measurement of the source PSCell and the target PSCell. Furthermore in some embodiments if an A5 event is configured for conditional PSCell change (the A5 event being where a source PSCell becomes worse than threshold1 and target PS Cell becomes better than threshold2), then the UE may be configured to include within the message information indicating the difference between the measurement of the target PSCell and threshold2.

Having received the SCG-Failure-information message the MN is configured to determine the target cell based on the prepared cells within the measurement results. In some embodiments the MN is configured to use the prepared cell information and the Cpsc-condition-diff for the selection of the target cell. This is shown in FIG. 6 by step 608.

In some embodiments the master node is configured to generate and transmit to the UE 601 a RRC-reconfiguration message. The RRC-reconfiguration message may comprise control for executing immediate PSCell change for prepared cell identity as shown in FIG. 6 by step 610. In some further embodiments the RRC-reconfiguration message may comprise control for executing PSCell change to a non-prepared inter-SN target cell as shown in FIG. 6 by step 612.

In some embodiments where the RRC-reconfiguration message may comprise control for executing PSCell change to a non-prepared inter-SN target cell then the master node (MN) 603 is further configured to generate and transmit a SN-modification-request message to the secondary node (SN) 605 as shown in FIG. 6 by step 614. In some embodiments the SN-modification-request message comprises a SCG-Failure-Indicator and furthermore a flag or parameter indicating that the PSCell change is triggered.

In such embodiments the failure message may provide the MN with additional information about the prepared target PSCells when S-RLF is detected. Additionally using the extended information in SCG failure report, the MN can react immediately by triggering the execution of conditional PSCell change without waiting for the SN to respond back using MN radio link which saves additional signaling over the Xn interface and reduces the delay in handling the S-RLF. Furthermore in some embodiments because of the extended SCG-Failure information, the NW can release pre-reserved resources in those candidate PSCells which are not considered anymore (e.g. based on reported measurements for prepared PSCells).

Figure 7:
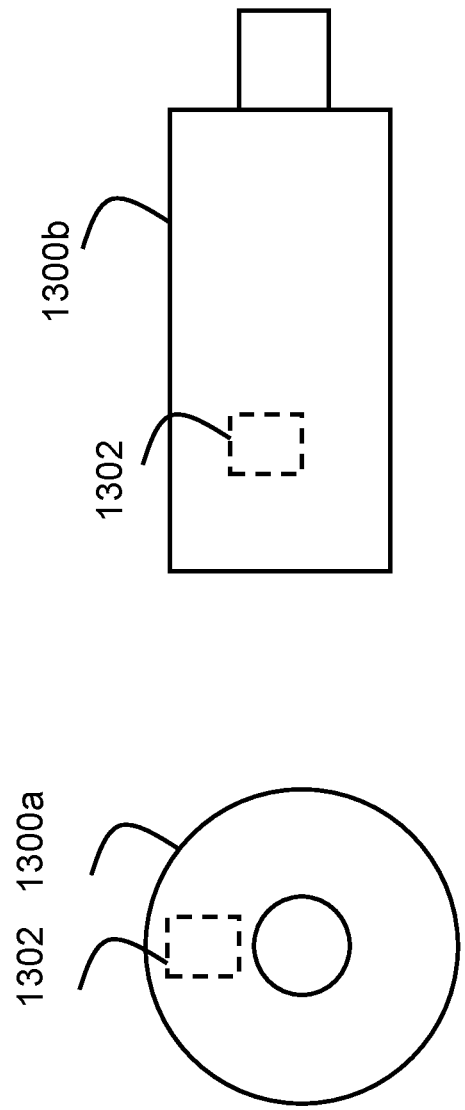
FIG. 7 shows a schematic representation of a non-volatile memory medium storing instructions which when executed by a processor allow a processor to perform one or more of the steps of the process or method of any of FIGS. 4 to 6.

FIG. 7 shows a schematic representation of non-volatile memory media 1300*a* (e.g. computer disc (CD) or digital versatile disc (DVD)) and 1300*b* (e.g. universal serial bus (USB) memory stick) storing instructions and/or parameters 1302 which when executed by a processor allow the processor to perform one or more of the steps of the processes or methods of FIGS. 4 to 6.

It is to be noted that embodiments of the present invention may be implemented as circuitry, in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

The invention claimed is:

1. An apparatus comprising:
at least one processor; and
at least one memory including computer program code;
the at least one memory and the computer program code configured to, with the at least one processor, cause the apparatus at least to:
operate the apparatus in a dual connectivity mode, wherein the apparatus is in communication with a master cell group comprising a primary cell and at least one secondary cell and the apparatus is in communication with a secondary cell group comprising a primary cell and at least one secondary cell;
detect a radio link failure between the apparatus and the primary cell of the secondary cell group; and
provide information based on the radio link failure to a master node for the master cell group, the information explicitly informing the master node that the radio link failure occurred on the secondary cell group while the apparatus was waiting for a prepared conditional cell change from the primary cell of the secondary cell group to be fulfilled prior to initiation of execution of the prepared conditional cell change by the apparatus.

2. The apparatus of claim 1, wherein the at least one memory and the computer program code are configured to, with the at least one processor, cause the apparatus at least to send the information configured by a secondary node for the secondary cell group via its radio link or a radio link of the master node.

3. The apparatus of claim 1, wherein the information is further configured to inform the master node of an identity value associated with at least one candidate cell from the secondary cell group for which the apparatus has valid conditional change configuration.

4. The apparatus of claim 3, wherein the identity value is provided as a bitmap configured to indicate the at least one candidate cell within a measured cell list.

5. The apparatus of claim 1, wherein the information is further configured to inform the master node of (i) a conditional change execution condition associated with at least one candidate cell from the secondary cell group and (ii) a signal measurement of the primary cell of the secondary cell group and the at least one candidate cell from the secondary cell group.

6. The apparatus of claim 5, wherein:
the signal measurement is a difference between the primary cell of the secondary cell group and the at least one candidate cell; and
the information further comprises a respective conditional change execution condition for the conditional cell change associated with the cell.

7. The apparatus of claim 1, wherein the at least one memory and the computer program code are configured to, with the at least one processor, cause the apparatus at least to:
receive from the master node a radio resource control message comprising a cell identity of a prepared cell from the secondary cell group to change to; and
perform a cell change from the primary cell of the secondary cell group to the prepared cell from the secondary cell group based on the cell identity.

8. The apparatus of claim 1, wherein the at least one memory and the computer program code are configured to, with the at least one processor, cause the apparatus at least to:
receive from the master node a radio resource control reconfiguration message comprising a cell identity of a cell other than a prepared cell from the secondary cell group to change to; and
perform a cell change from the primary cell of the secondary cell group to an unprepared cell from the secondary cell group based on the cell identity.

9. The apparatus of claim 1, wherein the apparatus is a user equipment.

10. An apparatus comprising:
at least one processor; and
at least one memory including computer program code;
the at least one memory and the computer program code configured to, with the at least one processor, cause the apparatus at least to:
communicate with at least one further apparatus, wherein the further apparatus is configured to operate in a dual connectivity mode, in communication with a master cell group controlled by the apparatus for a primary cell and at least one secondary cell and in communication with a secondary cell group comprising a primary cell and at least one secondary cell; and
receive information from the at least one further apparatus based on a radio link failure between the at least one further apparatus and the primary cell of the secondary cell group, the information explicitly informing the apparatus that the radio link failure occurred on the secondary cell group while the at least one further apparatus was waiting for a prepared conditional cell change from the primary cell of the secondary cell group to be fulfilled prior to initiation of execution of the prepared conditional cell change by the at least one further apparatus.

11. The apparatus of claim 10, wherein the information is further configured to inform the apparatus of an identity value associated with at least one candidate cell from the secondary cell group for which the at least one further apparatus has valid conditional change configuration.

12. The apparatus of claim 11, wherein the identity value is provided as a bitmap configured to indicate the at least one candidate cell within a measured cell list.

13. The apparatus of claim 10, wherein the information is further configured to inform the apparatus of (i) a conditional change execution condition associated with at least one candidate cell from the secondary cell group and (ii) a signal measurement of the primary cell of the secondary cell group and the at least one candidate cell from the secondary cell group.

14. The apparatus of claim 13, wherein:
the signal measurement is a difference between the primary cell of the secondary cell group and the at least one candidate cell; and
the information further comprises a respective conditional change execution condition for the conditional cell change associated with the cell.

15. The apparatus of claim 10, wherein the at least one memory and the computer program code are configured to, with the at least one processor, cause the apparatus at least to:
generate a radio resource control message comprising a cell identity of a prepared cell from the secondary cell group to change to based on the information; and
provide the radio resource control message to the at least one further apparatus such that the at least one further apparatus is configured to perform a cell change from the primary cell of the secondary cell group to the prepared cell from the secondary cell group based on the cell identity.

16. The apparatus of claim 10, wherein the at least one memory and the computer program code are configured to, with the at least one processor, cause the apparatus at least to:
generate a radio resource control reconfiguration message comprising a cell identity of a cell other than a prepared cell from the secondary cell group to change to based on the information; and
provide the radio resource control message to the at least one further apparatus such that the at least one further apparatus is configured to perform a cell change from the primary cell of the secondary cell group to an unprepared cell from the secondary cell group based on the cell identity.

17. The apparatus of claim 10, wherein the apparatus is a master node of the master cell group.

18. An apparatus comprising:
at least one processor; and
at least one memory including computer program code;
the at least one memory and the computer program code configured to, with the at least one processor, cause the apparatus at least to:
communicate with at least one further apparatus, wherein the further apparatus is configured to operate in a dual connectivity mode, in communication with a master cell group comprising a primary cell and at least one secondary cell and in communication with a secondary cell group comprising a primary cell and the apparatus as a secondary cell; and
receive a message from a master node for the master cell group, the message comprising information about execution by the at least one further apparatus of a triggered cell change for the primary cell of the secondary cell group, the information explicitly informing the apparatus that the radio link failure occurred on the secondary cell group while the at least one further apparatus was waiting for a prepared conditional cell change from the primary cell of the secondary cell group to be fulfilled prior to initiation of execution of the prepared conditional cell change by the at least one further apparatus.

19. The apparatus of claim 18, wherein the apparatus is a secondary node for the secondary cell group.

20. The apparatus of claim 10, wherein the at least one memory and the computer program code are configured to, with the at least one processor, cause the apparatus at least to transmit a message to a secondary node for the secondary cell group, the message comprising information about execution by the at least one further apparatus of a triggered cell change for the primary cell of the secondary cell group.

* * * * *